United States Patent
Wang et al.

(10) Patent No.: US 10,450,195 B2
(45) Date of Patent: Oct. 22, 2019

(54) PROCESS AND APPARATUS FOR THE PRODUCTION OF SYNTHESIS GAS

(71) Applicant: GTLpetrol LLC, New York, NY (US)

(72) Inventors: Shoou-I Wang, Las Vegas, NV (US); John Michael Repasky, Allentown, PA (US); Shankar Nataraj, Allentown, PA (US); Xiang-Dong Peng, Orefield, PA (US)

(73) Assignee: Niquan Energy LLC, Washington, DC (US)

( * ) Notice: Subject to any disclaimer, the term of this patent is extended or adjusted under 35 U.S.C. 154(b) by 244 days.

(21) Appl. No.: 14/691,395

(22) Filed: Apr. 20, 2015

(65) Prior Publication Data

US 2016/0016793 A1    Jan. 21, 2016

Related U.S. Application Data

(63) Continuation of application No. 13/774,833, filed on Feb. 22, 2013, now Pat. No. 9,011,814, which is a
(Continued)

(51) Int. Cl.
*C01B 3/38* (2006.01)
*B01J 8/02* (2006.01)
(Continued)

(52) U.S. Cl.
CPC ............. *C01B 3/382* (2013.01); *B01J 8/0285* (2013.01); *B01J 8/0488* (2013.01); *B01J 8/067* (2013.01);
(Continued)

(58) Field of Classification Search
CPC combination set(s) only.
See application file for complete search history.

(56) References Cited

U.S. PATENT DOCUMENTS

| | | | | |
|---|---|---|---|---|
| 3,723,344 A | * | 3/1973 | Reynolds | .................. C01B 3/16 |
| | | | | 252/373 |
| 3,919,113 A | * | 11/1975 | Reynolds | .................. C01B 3/16 |
| | | | | 252/373 |

(Continued)

FOREIGN PATENT DOCUMENTS

| | | |
|---|---|---|
| WO | WO 98/32817 | 7/1998 |
| WO | WO 00/03126 | 1/2000 |
| WO | WO 00/09441 | 2/2000 |

*Primary Examiner* — Kaity V Chandler
(74) *Attorney, Agent, or Firm* — Mark Wisnosky

(57) ABSTRACT

Reactive diluent fluid (22) is introduced into a stream of synthesis gas (or "syngas") produced in a heat-generating unit such as a partial oxidation ("PDX") reactor (12) to cool the syngas and form a mixture of cooled syngas and reactive diluent fluid. Carbon dioxide and/or carbon components and/or hydrogen in the mixture of cooled syngas and reactive diluent fluid is reacted (26) with at least a portion of the reactive diluent fluid in the mixture to produce carbon monoxide-enriched and/or solid carbon depleted syngas which is fed into a secondary reformer unit (30) such as an enhanced heat transfer reformer in a heat exchange reformer process. An advantage of the invention is that problems with the mechanical integrity of the secondary unit arising from the high temperature of the syngas from the heat-generating unit are avoided.

4 Claims, 3 Drawing Sheets

Related U.S. Application Data continuation of application No. 12/704,311, filed on Feb. 11, 2010, now Pat. No. 8,383,078, which is a continuation of application No. 10/518,038, filed as application No. PCT/IB03/00695 on Feb. 24, 2003, now Pat. No. 7,670,586, which is a continuation of application No. 10/083,778, filed on Feb. 25, 2002, now abandoned.

(51) Int. Cl.
*C10K 3/02* (2006.01)
*B01J 8/04* (2006.01)
*B01J 8/06* (2006.01)
*C01B 3/36* (2006.01)
*C01B 3/26* (2006.01)
*C10J 3/02* (2006.01)
*C10J 3/20* (2006.01)

(52) U.S. Cl.
CPC ........... *C01B 3/26* (2013.01); *C01B 3/36* (2013.01); *C01B 3/384* (2013.01); *C01B 3/386* (2013.01); *C10J 3/02* (2013.01); *C10J 3/20* (2013.01); *C10K 3/026* (2013.01); *B01J 2208/0053* (2013.01); *B01J 2208/00256* (2013.01); *B01J 2208/00504* (2013.01); *B01J 2219/00006* (2013.01); *C01B 2203/0233* (2013.01); *C01B 2203/0244* (2013.01); *C01B 2203/0255* (2013.01); *C01B 2203/0261* (2013.01); *C01B 2203/0283* (2013.01); *C01B 2203/06* (2013.01); *C01B 2203/061* (2013.01); *C01B 2203/062* (2013.01); *C01B 2203/0838* (2013.01); *C01B 2203/0844* (2013.01); *C01B 2203/0877* (2013.01); *C01B 2203/127* (2013.01); *C01B 2203/1241* (2013.01); *C01B 2203/141* (2013.01); *C01B 2203/143* (2013.01); *C10J 2300/094* (2013.01); *C10J 2300/0976* (2013.01); *C10J 2300/0986* (2013.01); *Y02E 60/324* (2013.01); *Y02P 20/52* (2015.11)

(56) References Cited

U.S. PATENT DOCUMENTS

| | | | | |
|---|---|---|---|---|
| 3,919,114 A * | 11/1975 | Reynolds | C01B 3/16 | 252/373 |
| 4,052,176 A * | 10/1977 | Child | B01D 53/1406 | 252/373 |
| 4,159,201 A * | 6/1979 | Staege | C01B 3/38 | 423/224 |
| 4,265,868 A * | 5/1981 | Kamody | C01B 3/34 | 423/418.2 |
| 4,919,844 A * | 4/1990 | Wang | B01J 8/062 | 252/373 |
| 5,011,625 A * | 4/1991 | Le Blanc | B01J 8/025 | 252/373 |
| 5,122,299 A * | 6/1992 | LeBlanc | B01J 8/025 | 252/373 |
| 5,362,453 A * | 11/1994 | Marsch | B01J 8/067 | 422/625 |
| 5,478,370 A * | 12/1995 | Spangler | C01B 3/384 | 252/373 |
| 6,077,323 A * | 6/2000 | Nataraj | C01B 3/36 | 252/373 |
| 6,114,400 A * | 9/2000 | Nataraj | C01B 3/36 | 252/373 |
| 6,241,792 B1 * | 6/2001 | Schuessler | B01B 1/005 | 422/187 |
| 6,527,980 B1 * | 3/2003 | Roden | C01B 3/384 | 252/373 |
| 2010/0140553 A1 * | 6/2010 | Wang | B01J 8/0488 | 252/373 |

\* cited by examiner

PROCESS AND APPARATUS FOR THE PRODUCTION OF SYNTHESIS GAS

CROSS-REFERENCE TO RELATED APPLICATIONS

This application is a continuation application of U.S. patent application Ser. No. 13/774,833, filed on Feb. 22, 2013, which is a continuation of U.S. patent application Ser. No. 12/704,311, filed on Feb. 11, 2010, which is a continuation of U.S. application Ser. No. 10/518,038 (now U.S. Pat. No. 7,670,586), filed on Dec. 13, 2005, which is a national stage application of International Application PCT/IB03/00695, filed on Feb. 24, 2003, which is a continuation of and claims priority to U.S. application Ser. No. 10/083,778, filed on Feb. 25, 2002, the entire disclosures of which are incorporated herein by reference.

BACKGROUND

The present invention relates to a process and apparatus for the production of synthesis gas, particularly for but not necessarily limited to, use in the production of hydrocarbon liquid fuels (e.g. using the Fischer-Tropsch ("F-T") process), methanol (e.g. by catalytic hydrogenation of carbon monoxide), oxo-alcohols and dimethyl ether ("DME").

Natural gas may be found in remote locations both on- and offshore. It is generally expensive and impractical to transport natural gas from its source to a distant processing plant. One solution is to convert the gas on-site to a valuable and easily transportable product. In this way, the value of the natural gas may be increased.

Natural gas may be converted to synthesis gas (or "syngas") which is a mixture of carbon monoxide and hydrogen. Syngas may be converted to a solid or liquid synthetic fuel ("synfuel") or converted to methanol, oxo-alcohols or DME. For optimum conversion in the F-T process, the ratio of hydrogen to carbon monoxide is preferably about 2 to 1. The conversion products have less volume per unit mass (i.e. have a greater density) than the natural gas. Accordingly, it is more economical to transport conversion products than a corresponding amount of natural gas.

Syngas may be produced using a heat exchange reforming ("HER") process. A conventional two-step HER process may use natural gas as feedstock and employs a primary exothermic (or heat-generating) unit producing syngas, e.g. from natural gas and oxygen, coupled with a secondary endothermic (or heat-requiring) unit that uses at least a portion of the heat generated in the primary unit to produce further syngas, e.g. by a reforming reaction of natural gas and steam. In certain HERs, the syngas generated by the HER feeds the primary exothermic unit, while other HERs operate in parallel to the exothermic unit and augment the syngas production therein.

There are several methods of producing syngas from natural gas. Examples of these methods include:

(a) Steam-methane reforming ("SMR") which uses an endothermic catalysed reaction between natural gas and steam. There is a need to import carbon dioxide or otherwise remove excess hydrogen to achieve the required ratio of 2 to 1 for the relative proportions of hydrogen and carbon monoxide in the resultant syngas. In many applications (including F-T processes, methanol synthesis and other chemical processes), such an opportunity to import carbon dioxide and/or export any separated excess hydrogen may not be available and/or economical;

(b) Partial oxidation ("PDX") of natural gas with pure oxygen which achieves a hydrogen to carbon monoxide ratio in the resultant syngas in the range from 1.6-1.8 to 1. Imported hydrogen is needed to achieve that required ratio of 2 to 1 for the relative proportions of hydrogen and carbon monoxide in the resultant syngas;

(c) Autothermal reforming ("ATR") which uses a partial oxidation burner followed by a catalyst bed with a feed of natural gas, steam and oxygen to produce the required 2 to 1 ratio for the relative proportions of hydrogen and carbon monoxide in the resultant syngas; and (d) Catalytic partial oxidation ("CPO") which is the reaction of natural gas with oxygen over a catalyst that permits flameless partial combustion to hydrogen and carbon monoxide in the required relative proportions in the resultant syngas.

For PDX, ATR and CPO, the oxidation reaction in the primary heat-generating unit is exothermic and, thus, the syngas is produced at elevated temperature. For example, PDX produces syngas at a temperature of from 1200 to 1400° C., ATR produces syngas at a temperature of from 900 to 1100.degree. C. and CPO produces syngas at a temperature of from 1000 to 1100.degree. C.

The excess heat generated in these processes may be used to generate steam, for example in waste heat boilers, that can be used in steam turbines to generate power for air separation systems, air compressors and other equipment.

The excess heat may be used with additional natural gas and steam in a separate secondary unit to generate further syngas via steam-methane reforming. This process is the basis of the generic two-step HER process. In such a process, the high temperature syngas from the primary heat-generating unit is usually introduced to the shell-side of a shell and tube style steam-methane reformer. The tubes may contain conventional steam-methane reforming catalyst over which natural gas and steam react endothermically to form syngas. The heat from syngas on the shell-side of the reformer is used to drive the endothermic steam-methane reforming reaction. The syngas stream leaving the tubes can be separately collected and used to feed the primary exothermic syngas generator. Preferably, however, the syngas streams leaving the tubes are combined with the syngas on the shell-side to produce syngas having the desired ratio of hydrogen to carbon monoxide at a temperature of from 500 to 600.degree. C.

A secondary unit in which reforming takes place over catalyst using heat taken from the primary heat-generating unit is known as a Heat Exchange Reformer. One such example is described in U.S. Pat. No. 4,919,844 (Wang; published on 24, Apr. 1990) and is called an Enhanced Heat Transfer Reformer (or "EHTR"). The disclosure of this patent is incorporated herein by reference. Other existing HER processes are disclosed in WO-A-98/32817 (Halmo et al; published on 30, Jul. 1998), WO-A-00/09441 (Abbot; published on 24, Feb. 2000), WO-A-00/03126 (Fjellhaug et al; published on 20, Jan. 2000) and U.S. Pat. No. 5,362,453 (Marsch; published on 8, Nov. 1994). These disclosures are also incorporated herein by reference.

An example of an HER process is disclosed in U.S. Ser. No. 09/965,979 (filed on 27, Sep. 2001 and claiming priority from GB0025150.4 filed on 13, Oct. 2000) and this disclosure is incorporated herein by reference. In this example, a PDX reactor is used in combination with an EHTR. Hydrocarbon fuel gas is reacted with steam and/or oxygen gas in a syngas generation system to produce a syngas product stream. An oxidant gas is compressed to produce a compressed oxidant gas, at least a portion of which is combusted in the presence of combustion fuel gas to produce combustion product gas. The combustion product gas is expanded to produce power and expanded combustion product gas. Heat from the expanded combustion product gas is recovered by using the expanded combustion product gas to heat steam by heat exchange to produce heated steam, at least a portion of which is used to provide at least a portion of any steam requirement for producing the syngas product stream in the syngas generation system. Additionally or alternatively, at least a portion of the oxygen gas is provided using an ASU that is driven by at least a portion of the power generated by the expansion of the combustion product gas.

Syngas product feeding conversion processes will unavoidably contain carbon dioxide. For F-T synfuel processes that use cobalt catalysts, this carbon dioxide behaves like an inert. Whilst it can be vented downstream, the carbon and oxygen capture efficiency of the entire gas to liquid ("GTL") process is lower, which contributes to the greenhouse effect. It is thus desirable to recycle this carbon dioxide to the front-end syngas generator. It is a primary objective of preferred embodiments of this invention to enable efficient recycle of carbon dioxide and affect its efficient conversion to useful carbon monoxide, while minimizing the amount of such recycle and usage of oxygen feedstock.

Loss of carbon dioxide and methane from natural gas conversion processes is undesirable for several reasons. First, these gases are well known to have "greenhouse gas" properties. Secondly, valuable carbon atoms are being lost to the atmosphere thereby affecting the carbon efficiency and yield of the overall processes. Therefore, it is also an objective of preferred embodiments of the present invention to reduce the emission level of these greenhouse gases and other pollutants, for example oxides of nitrogen ("NO.sub.x"), and to recover at least some of the valuable carbon that is usually lost in natural gas conversion processes using HER technology for syngas generation.

In HER processes where hot gas is introduced to the shell-side of an HER, it is undesirable for the temperature of the syngas leaving the primary heat-generating unit to be too high as the mechanical integrity of the HER may be challenged. For example, the metal of the HER may lose its physical strength and soften. Therefore, it is another objective of preferred embodiments of the present invention to reduce or eliminate the possibility of problems with the mechanical integrity of the HER resulting from excessive syngas temperature in natural gas conversion processes using HER technology.

The PDX process can generate syngas with small amounts of solid carbon particles or soot. This soot could foul or erode the heat exchange surfaces in the downstream HER. It is thus another objective of this invention to reduce or eliminate the potential for problems arising for such solid carbon particles.

U.S. Pat. No. 4,731,098 (Marsch: published on 15, Mar. 1988) discloses a reformer in which natural gas and steam are reformed to produce syngas. The syngas is then mixed with natural gas and oxygen or air before the mixture leaves the reformer.

Water has been used as a diluent in the production of syngas. Examples of such use of water have been disclosed by P. Osterrieth and M. Quintana ("A New Approach to the Production of Custom-made Synthesis Gas Using Texaco's Partial Oxidation Technology"; Texaco Development Corporation; AIChE meeting Presentation, 6, Mar. 1988) and by W. Francis Fong and M. E. Quintana ("HyTEX: A Novel Process for Hydrogen Production"; Texaco Development Corporation; NPRA 89th Annual Meeting, 17-19, Mar. 1991, San Antonio, Tex.)

U.S. Pat. No. 3,723,344 (Reynolds; published on 23, Mar. 1973) and U.S. Pat. No. 3,919,114 (Reynolds; published on 11, Nov. 1975) both describe processes for the generation of synthesis gas. The synthesis gas is produced by the partial oxidation of hydrocarbon fuel with a free oxygen-containing gas, optionally, in the presence of a temperature moderator such as steam. Carbon dioxide-rich gas or steam is combined with a stream of the synthesis gas product and the gaseous mixture is then subjected to a non-catalytic water gas reverse shift reaction and a portion of the carbon dioxide in the combined stream is reduced to carbon monoxide while simultaneously a stoichiometric amount of hydrogen is oxidized to water. Heat is removed from the resultant shift product gas in a waste heat boiler. Soot is then removed from the resultant cooled shift product gas using quench water in a gas-liquid contact apparatus. Carbon dioxide is then removed from the soot-depleted shift product gas and the resultant synthesis gas is then used in the synthesis of hydrocarbons and/or methanol.

In meeting the above-mentioned objectives, it is also important that any modifications to existing HER processes do not affect adversely the yield of conversion products, the capital and/or operating costs and the level of power usage.

BRIEF SUMMARY OF THE INVENTION

It has been found that these objectives may be achieved with the introduction of a cooling stream of reactive diluent fluid to the syngas produced in the primary heat-generating unit to produce a cooled mixture of syngas and reactive diluent fluid and the subsequent reaction of at least two of the components of the mixture to either produce further carbon monoxide and/or to gasify solid carbon particles.

Hydrocarbon-containing fuel is exothermically reacted with an oxidant gas comprising molecular oxygen in a first reactor to produce an exothermically-generated syngas product. A stream of reactive diluent fluid is combined with a stream of said exothermically-generated syngas product to produce a reactive mixture and the reactive mixture is reacted in a second reactor to produce a reacted syngas product. The reacted syngas is introduced into a secondary reforming unit in an HER process. One advantage of the invention is that the reacted syngas product is cooled before being introduced into the secondary unit thereby avoiding negatively affecting the mechanical integrity of the secondary unit.

If the reactive diluent fluid comprises gases produced downstream in the overall process that would otherwise be vented to the atmosphere or that would have to undergo treatment before venting to atmosphere, the level of pollutant emissions to the environment may be reduced and corresponding cost savings may be achievable from the pollutant gas treatment processes.

Carbon dioxide and hydrogen present in the reactive mixture may be converted into water and valuable carbon monoxide. This conversion is particularly useful when the reactive diluent fluid is carbon dioxide. However, it still has useful application when the reactive diluent fluid is not carbon dioxide but the source of hydrocarbon fuel (e.g. natural gas) containing significant quantities of carbon dioxide. The additional carbon monoxide produced may be used downstream to improve the yield of the natural gas conversion products. If the reactive diluent fluid comprises carbon dioxide that has been recycled from downstream processes then there is a further advantage in that the level of carbon dioxide emission to the environment is reduced.

If the syngas is utillized in an F-T synfuel process, the gas exiting such a downstream process can contain significant amounts of carbon dioxide. Such gas typically also contains unconverted syngas as well as light hydrocarbons. It is particularly advantageous to this invention to recycle such carbon dioxide-comprising gas as the reactive diluent. Such gas can be recycled as diluent without further processing in which case the other components (other than carbon dioxide) would participate in the reaction, increasing the production of desired synfuel. Alternately, the carbon dioxide content of such gas can be isolated in an acid gas removal ("AGR") unit for recycle to the front end of the process and the other components could be used as fuel. The carbon dioxide, steam, oxygenates and molecular hydrogen in the recycled diluent can participate in the gasification of soot.

A reverse water gas shift reaction may be used to convert the carbon dioxide and hydrogen into water and valuable carbon monoxide. Such a reaction is endothermic and, thus, uses heat from the reactive mixture thereby imposing additional cooling on the syngas and assisting in the overall ability to maintain mechanical integrity in a secondary reforming unit of an HER process.

In existing HER processes where carbon dioxide is recycled from downstream processes, the carbon dioxide is fed to the tube side of the HER unit of the synthesis gas generation system. In the tubes of the HER unit, the following two reactions take place:

$$CO_2 + CH_4 \rightarrow 2CO + 2H_2$$

$$CH_4 + H_2O \rightarrow CO + 3H_2$$

Reaction (I) is thermodynamically less favourable than reaction (II) and requires higher temperatures. The temperature at the exit of the HER tubes is necessarily lower than the temperature of the gas from the exothermic reactor. Therefore, the carbon dioxide is not completely converted when the syngas exits the tubes of the reformer unit. If the HER is a parallel type (such as an EHTR), this can lead to excessive costs associated with the recycle of carbon dioxide.

According to preferred embodiments of the present invention, carbon dioxide is converted to carbon monoxide in a reverse water gas shift reaction before being fed to the secondary reformer unit. The following reaction takes place in the reverse water gas shift reactor:

$$CO_2 + H_2 \leftrightarrows CO + H_2O$$

Reaction (III) is in equilibrium but the position of the equilibrium is pushed far over to the right hand side due to the high temperature of the syngas and the continual introduction of carbon dioxide. Therefore, by recycling carbon dioxide, injecting it into the exothermically-generated syngas product produced in the primary heat-generating unit and subjecting the reactive mixture to a reverse water gas shift reaction, more carbon dioxide may be converted to useful carbon monoxide. This conversion minimizes the size of the carbon dioxide recycle loops and associated costs. In addition, the reverse shift reaction zone assists in the gasification of any soot in the syngas from a PDX-type exothermic unit, mitigating any erosion or fouling concerns in the surfaces of heat exchangers downstream, including HERs, boilers and preheaters. It can also eliminate the requirement of a scrubber that normally accompanies PDX processes.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference symbols in the various drawings indicate like elements.

DETAILED DESCRIPTION

Figure 1:
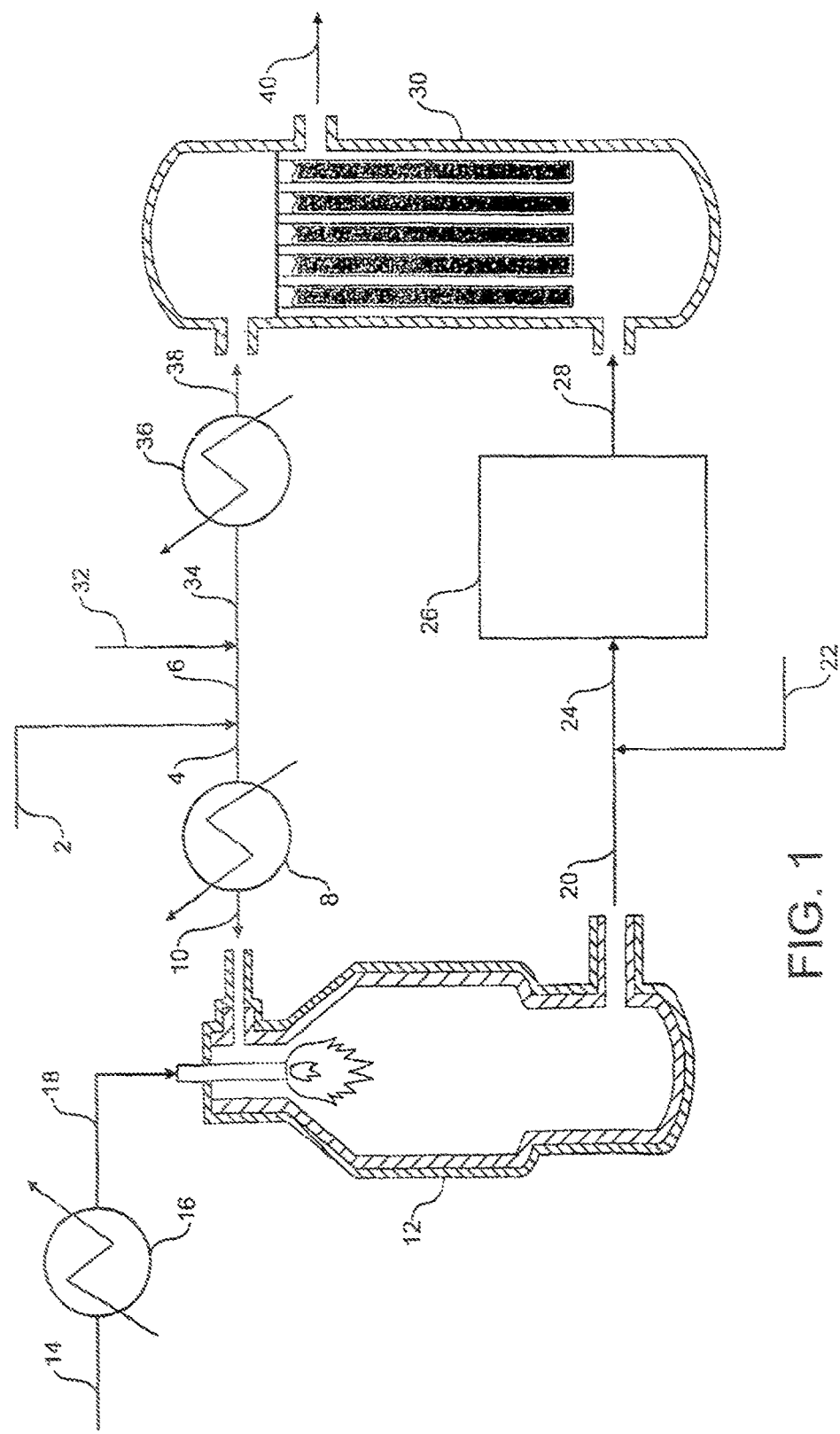
FIG. 1 is a flowsheet describing one embodiment of the process of the present invention.

According to one aspect of the present invention, there is provided a process for the production of syngas comprising carbon monoxide and molecular hydrogen, said process comprising;

exothermically reacting hydrocarbon-containing fuel an oxidant gas comprising molecular oxygen in a first reactor to produce an exothermically-generated syngas product;

combining a stream of reactive diluent fluid with a stream of said exothermically-generated syngas product to produce a reactive mixture;

reacting said reactive mixture in a second reactor to produce a reacted syngas product; and endothermically reforming hydrocarbon-containing fuel gas with steam over a catalyst in a heat exchange reformer to produce a heat exchange-reformed syngas product, wherein at least a portion of the heat required in the generation of said heat exchange-reformed syngas product is obtained by recovering heat from said reacted syngas product thereby cooling said reacted syngas.

The "reactive diluent fluid" includes any diluent fluid that is capable of cooling syngas by direct heat exchange and comprising at least one component that may react with at least one component of the synthesis gas. The "reactive mixture" comprises cooled exothermically generated syngas product and reactive diluent fluid. The "reacted syngas product" includes the product syngas that has undergone a further reaction either to produce further carbon monoxide or to remove solid carbon particles, e.g. soot, produced as a by-product of the oxidation reaction in the primary heat-generating unit. Thus, the present may be used for soot control purposes.

The hydrocarbon fuel may be a solid or liquid fuel but it is preferably a gas. Natural gas is the preferred fuel. Pure molecular oxygen is preferred as the oxidant gas over an oxidant gas comprising molecular oxygen such as air. Water may be present in the reaction to produce exothermnically-generated syngas product (for example, if an ATR process is used). If water is present, it may be used in liquid form in which case it will vaporise immediately upon entry into the first reactor. However, the use of steam is preferred.

An advantage of this invention is that the temperature of the exothermnically-generated syngas product is reduced and may be controlled as required for downstream processing. The downstream mechanical integrity problems that may result from the high levels of heat generated in the primary heat-generating unit may be avoided and process operability may be improved by controlling the reduced temperature of the exothermically-generated syngas product.

Another advantage of this invention that any solid carbon present in the exothermically-generated syngas product can be at least partially gasified mitigating fouling, erosion or plugging of downstream heat exchangers such as HERs, boilers or preheaters.

Where the reactive mixture comprises carbon dioxide, at least a portion of the carbon dioxide may be reacted together with at least a portion of the molecular hydrogen in said mixture over a catalyst in a reverse water gas shift reaction zone to produce a carbon monoxide-enriched syngas product.

Where the reactive mixture comprises solid carbon particles, at least a portion of the particles may be gasified by reaction with at least one other component of the mixture in a gasification zone to produce a solid carbon-depleted syngas product. The gasification reaction preferably occurs on the surface of a gasification reaction support structure and may be catalysed.

The process further comprises endothermically reforming hydrocarbon-containing fuel gas with steam over a catalyst in a heat exchange reformer to produce a heat exchange-reformed syngas product. At least a portion of the heat required in the generation of said heat exchange-reformed syngas product is obtained by recovering heat from said reacted syngas product thereby cooling the reacted syngas product. Use of this heat in this way provides further overall cooling of the syngas. The heat exchange-reformed syngas product may be combined with the reacted syngas product prior to heat recovery.

When the reactive diluent fluid is a gas, the exothermically-generated syngas product is first cooled via sensible heat exchange. When the reactive diluent fluid is a liquid, initial cooling occurs via vaporisation and sensible heat exchange. The reactive diluent fluid may be recovered and recycled from downstream processing of syngas. The reactive diluent fluid may promote the gasification of any solid carbon particles or soot present in the reactive mixture. The reactive diluent fluid may be imported from an external source.

The reactive diluent fluid preferably comprises carbon dioxide. An advantage of using carbon dioxide as the diluent is that it may be readily converted to more useful carbon monoxide via a reverse water-gas shift reaction (see reaction (III)), resulting in more carbon monoxide being available for downstream processing. In addition, if the carbon dioxide has been recycled from downstream processes, the potential emission level of this greenhouse gas is reduced.

The reactive diluent fluid may comprise carbon dioxide separated, e.g. by acid gas recovery and recycled from downstream syngas or recovered and recycled from downstream processing of syngas. Alternately, the residual gas from a GTL reactor comprising carbon dioxide can be recycled without processing in an AGR unit. The reactive diluent may comprise the products of a combustion process which would contain a significant quantity of carbon dioxide. The combustion products may be selected from the group consisting of combustion furnace flue gases and gas turbine exhaust gas. The reactive diluent fluid may comprise carbon dioxide imported from an external source. For certain applications, the reactive diluent fluid may comprise carbon dioxide and methane either alone or together with other hydrocarbon(s) such as ethane, propane, butane, pentane, hexane and/or their isomers. In a typical F-T based GTL process, the diluent may be a residual effluent of the reactor after separation of synfuel and water. In this case, it would comprise of carbon dioxide, unreacted carbon monoxide and molecular hydrogen, low molecular weight paraffins, olefins and oxygenates. The recycling of these gases increases their utilization and increases the overall GTL process efficiency.

The reactive diluent fluid may comprise molecular hydrogen. The injection of hydrogen into the first syngas product pushes the position of the equilibrium in reaction (III) in a reverse water gas shift reaction towards the carbon monoxide product side. This effect is advantageous because it promotes the conversion of carbon dioxide to carbon monoxide.

The use of carbon dioxide or molecular hydrogen as diluent is advantageous as both gases are capable of promoting the gasification of carbon components in the mixture of cooled exothermically-generated syngas product and reactive diluent fluid.

The reactive diluent fluid may comprise water. The water may be in the form of liquid water or steam or may comprise a combination of liquid water and steam. The injection of water is primarily to promote the gasification of carbon components in the mixture of cooled exothermically-generated syngas product and reactive diluent fluid.

The reacted syngas product from the reformer or a syngas mixture derived therefrom is preferably used in a downstream conversion process to produce conversion products selected from the group consisting of hydrocarbon liquid fuels, methanol, DME and oxo-alcohols.

In another embodiment of the present invention, a second diluent fluid is combined with the syngas stream between the point at which the reactive diluent fluid is combined with the exothermically-generated syngas product and the point at which heat is recovered from the reacted syngas product to adjust the temperature and/or change the composition of the relevant gas stream.

The second diluent fluid may change the composition of the gas stream entering the shellside of a heat exchange reformer such that performance of the heat exchange reformer is enhanced. In another arrangement, the second diluent fluid may adjust the temperature of the gas stream entering the shellside of the heat exchange reformer such that the heat exchange reformer operates in a more desired temperature range. Composition change and/or temperature adjustment are achieved through physical/thermal mixing or/and reactions between the said reacted syngas product and the second diluent fluid.

The second diluent fluid may be combined with the reactive mixture in any section of the second reactor or may be combined with the reacted syngas product at any point between the second reactor and the heat exchange reformer. Where the heat exchange reformer is a shell and tube style reformer in which the endothermic reforming reaction occurs within the tubes and the reacted syngas product is introduced to the shell-side, the second diluent fluid is introduced in any section of the shell-side of the heat exchange reformer.

The second diluent fluid may be inert or reactive. The fluid may be selected from the group consisting of water vapor, steam, liquid water, molecular hydrogen, carbon dioxide, methane (and other light (e.g. C2 to C6) hydrocarbons), offgas from downstream processes, and other substances (previously identified) that could enhance the performance of the heat exchange reformer and could adjust its operating temperature.

Water and/or steam may be combined as the second diluent with the reacted syngas product to reduce the amount of metal dusting inside the heat exchange reformer and/or to adjust the temperature of the reacted syngas product. Such injection of water and/or steam increases the water concentration of the gas stream to the shellside of a heat exchange reformer. This increase in the water concentration reduces the severity of metal dusting conditions inside the heat exchange reformer. Water and/or steam can also adjust the temperature of the gas stream to the shellside of a heat exchange reformer to meet requirements of the reformer operation. The temperature, amount, and form of the water or steam (i.e. gaseous or liquid) can be selected to fit the needs of the heat exchange reformer.

Molecular hydrogen may be combined as the second diluent fluid with the reacted syngas product to enhance the heat exchange efficiency inside a heat exchange reformer. A recycle molecular hydrogen stream can be established as the second diluent. Due to the much greater heat conductivity of molecular hydrogen compared to other gases, the resulting hydrogen-rich environment can enhance the heat exchange efficiency inside a heat exchange reformer, thereby reducing the size and capital cost of the reformer.

The selection of the point at which the second diluent is introduced depends on the specific needs of a process. The injection can be made into any section of the second reactor comprising the shift reaction zone and/or the gasification zone, any section of the shellside of a heat exchange reformer, and between the second reactor and the heat exchange reformer. In the arrangement where steam is introduced to mitigate metal dusting inside a heat exchange reactor and adjust the temperature of the gas stream to the reformer, the injection point may be between the exit of the second reactor and the entrance to the shellside of the heat exchange reformer. Alternatively, if the objective of steam injection is only for mitigating metal dusting, steam can be introduced into the section of the heat exchange reformer where metal dusting may occur, namely the section where temperature drops below the carbon precipitation temperature.

The selection of injection point impacts on the performance and cost of a process. By way of comparison, introducing steam to the effluent of the primary reformer or to the tube side of the heat exchange reformer can also reduce metal dusting severity and/or adjust temperature. However, these two introduction points result in additional carbon dioxide in the syngas product due to water gas shift reaction in either the second reactor or inside the tubes of the heat exchange reformer. Increased carbon dioxide concentration results in higher carbon dioxide separation cost and/or negative impact on downstream processes. The injection of steam between the second reactor and the heat exchange reformer, as proposed by the above mentioned arrangement, does not produce additional carbon dioxide.

In a second aspect of the present invention, there is provided a process for the production of syngas comprising carbon monoxide and molecular hydrogen, said process comprising;

exothermically reacting hydrocarbon-containing fuel with an oxidant gas comprising molecular oxygen in a first reactor to produce an exothermically-generated syngas product;

cooling an effluent stream of said exothermically-generated syngas product by combining reactive diluent fluid with said stream to produce a mixture comprising cooled exothermically-generated syngas product and reactive diluent fluid, said mixture further comprising at least one component selected from the group consisting of carbon dioxide and solid carbon particles; said process further comprising:

reacting together carbon dioxide in said mixture with molecular hydrogen in said mixture over a catalyst in a second reactor to produce a reacted syngas product that is enriched in carbon monoxide; and/or gasifying solid carbon particles in said mixture with at least one other component in said mixture in a second reactor to produce a reacted syngas product that is depleted in solid carbon.

The step of the process to produce solid carbon-depleted syngas can be carried out instead of the step to produce carbon monoxide-enriched syngas and vice versa. Alternatively, the two steps can be carried out either sequentially or simultaneously. Preferably, the reacted syngas product is both enriched in carbon monoxide and depleted in solid carbon.

This process may also comprise endothermically reforming hydrocarbon-containing fuel gas with steam over a catalyst in a heat exchange reformer to produce a heat exchange reformed syngas product wherein at least a portion of the heat generated in the exothermic reaction producing said exothermically generated syngas product is used to drive the endothermic reforming reaction.

In a third aspect of the present invention, there is provided apparatus for the production of syngas comprising carbon monoxide and molecular hydrogen according the process of the first aspect, said apparatus comprising:

a first reactor in which hydrocarbon-containing fuel is reacted exothermically with an oxidant gas comprising molecular oxygen to produce an exothermically-generated syngas product;

conduit means for removing an effluent stream of said exothermically-generated syngas product from the first reactor;

means for combining a stream of reactive diluent fluid with said effluent stream to produce a reactive mixture;

a second reactor in which said reactive mixture reacts to produce a reacted syngas product;

a heat exchange reformer in which hydrocarbon-containing fuel gas is reformed endothermically with steam over a catalyst to produce a heat exchange-reformed syngas product; and conduit means for feeding a stream of reacted syngas product from the second reactor to the heat exchange reformer, wherein at least a portion of the heat required in the generation of said heat exchange-reformed syngas product is obtained by recovering heat from said reacted syngas product thereby cooling the reacted syngas product.

The first reactor is preferably selected from the group consisting of a PDX reactor, an ATR or a CPO reactor.

Where the reactive mixture comprises carbon dioxide, the second reactor preferably has a reverse water gas shift reaction zone in which at least a portion of the carbon dioxide and at least portion of the molecular hydrogen in the reactive mixture are reacted together over a catalyst to produce a carbon monoxide-enriched syngas.

Where the reactive mixture comprises solid carbon particles, the second reactor may have a gasification reaction zone in which at least a portion of the solid carbon particles is gasified by reaction with at least one other component of the reactive mixture to produce a solid carbon-depleted syngas.

The reformer is preferably a shell and tube style reformer in which the endothermic reforming reaction occurs within the tubes and the reacted syngas product is introduced to the shell-side. Most preferably, the reformer is an EHTR.

The apparatus may further comprise means for combining a second diluent fluid with a syngas stream between the point at which the reactive diluent is combined with said exothermically-generated syngas product and the point at which heat is recovered from the reacted syngas product to adjust the temperature and/or change the composition of relevant syngas stream.

In a fourth aspect of the present invention, there is provided apparatus for the production of syngas comprising carbon monoxide and molecular hydrogen according to the process of the second aspect, said apparatus comprising:

a first reactor in which hydrocarbon-containing fuel is reacted exothermically with an oxidant gas comprising molecular oxygen to produce an exothermically-generated syngas product;

a second reactor;
conduit means for feeding an effluent stream of said exothermically generated syngas product from the first reactor to the second reactor;
means for combining reactive diluent gas with said effluent stream to produce a mixture comprising cooled exothermically-generated syngas product and reactive diluent gas, said mixture further comprising at least one component selected from the group consisting of carbon dioxide and solid carbon particles;
said apparatus further comprising:
a reverse water gas shift reaction zone in which carbon dioxide in said mixture is reacted together with molecular hydrogen in said mixture over a catalyst in the second reactor to produce reacted synthesis gas product that is enriched in carbon monoxide; and/or
a gasification reaction zone in which solid carbon particles in said mixture are gasified with at least one other component in the second reactor to produce reacted syngas product that is depleted in solid carbon.

The apparatus may further comprise:
a heat exchange reformer in which hydrocarbon-containing fuel gas is reformed endothermically with steam over a catalyst to produce a heat exchange reformed syngas product; and
conduit means for reacted syngas product from the second reactor to the heat exchange reformer,
wherein at least a portion of the heat generated in the exothermic reaction producing said exothermically generated syngas product is used to drive the endothermic reforming reaction.

The first reactor is preferably a PDX reactor as this reactor produces the highest temperature syngas (when compared with ATR and CPO) and the higher the temperature of the syngas from the primary heat-generating unit, the higher the conversion of carbon dioxide in the reactive diluent and the better the efficiency of downstream HER processing. The PDX reactor is preferably used in combination with an EHTR as the heat exchange reformer.

EXAMPLE

Referring to FIG. 1, a stream 2 of natural gas is divided into a first portion 4 and a second portion 6. The first portion 4 is preheated by indirect heat exchange 8, hydrodesulfurized as required, and introduced into a PDX reactor 12. A stream 14 of oxygen is pre-heated by indirect heat exchange 16 and the pre-heated oxygen stream 18 is also fed to the PDX reactor 12. The natural gas and the oxygen are reacted together in the PDX reactor 12 to produce first syngas product. A stream 20 of first syngas product is removed from the PDX reactor 12 at a temperature of from 1200 to 1400.degree. C.

A stream 22 comprising carbon dioxide is introduced to and cools the first syngas product stream 20. The cooled stream 24 is fed to a reverse water gas shift reactor 26 in which at least a portion of the carbon dioxide from the cooled stream 24 is reacted with at least a portion of the hydrogen from the cooled stream 24 to produce carbon monoxide and water. The catalytic reaction is endothermic and, thus, a further cooling effect on the syngas is observed. A stream 28 of carbon monoxide-enriched syngas is removed from the reverse water gas shift reactor 26 and introduced to the shell-side of an EHTR 30.

A stream 32 of steam is introduced to the second portion 6 of the natural gas and the combined stream 34 is preheated by indirect heat exchange 36. The pre-heated combined stream 38 is introduced to the tube-side of the EHTR 30. The tubes of the EHTR 30 contain conventional steam-methane reforming catalyst and the natural gas and the steam react to form second syngas product. Heat from the shell-side of the EHTR 30 provided at least in part by the carbon monoxide-enriched syngas, is used to drive the endothermic catalytic steam-methane reforming reaction.

The second syngas product leaving the tubes of the EHTR 30 is combined with the first syngas product to form a combined syngas product. A stream 40 of combined syngas product is removed for downstream processing, in particular for the synthesis of hydrocarbon liquid fuels (e.g. by the F-T process), methanol (e.g. by the catalytic hydrogenation of carbon monoxide), oxo-alcohols and DME.

Tables 1 and 2 contains data for the composition of various streams in the process of FIG. 1 calculated in a computer simulation.

TABLE 1

| | STREAM ID | | | | | |
|---|---|---|---|---|---|---|
| | 2 | 4 | 6 | 18 | 20 | 22 |
| STREAM | NG FEED | NG TO POX | NG TO EHTR | POX O$_2$ | POX OUT | FT OFFGAS |
| Temperature ° C. (F.) | 16 (60) | 363 (685) | 363 (685) | 232 (449) | 1343 (2450) | 38 (100) |
| Pressure MPa (psig) | 3.55 (515) | 3.41 (494) | 3.41 (494) | 3.17 (463) | 2.84 (412) | 4.14 (600) |
| Mole Flow Kg mol/h (lb mol/hr) | 8411 (18542) | 6564 (14471) | 2111 (4653) | 4167 (9187) | 19693 (43416) | 1014 (2301) |
| Enthalpy MMX3/h (MMBtu/hr) | −658.8 (−625.0) | −391.7 (−371.6) | −126.0 (−119.5) | 25.6 (24.3) | −367.1 (−348.3) | −412.0 (−390.9) |

| | STREAM ID | | | |
|---|---|---|---|---|
| | 24 | 28 | 38 | 40 |
| STREAM | QUENCH | CATBED OUT | EBTR FEED | EHTR OUT |
| Temperature ° C. (F.) | 1245 (2270) | 1197 (2186) | 310 (930) | 390 (1094) |
| Pressure MPa (psig) | 2.84 (412) | 2.84 (412) | 3.34 (484) | 2.84 (412) |
| Mole Flow Kg mol/h (lb mol/hr) | 20737 (45717) | 20823 (451818) | 6577 (14499) | 30953 (68238) |
| Enthalpy MMX3/h (MMBtu/hr) | −779.1 (−739.2) | −779.1 (−719.1) | −1112.0 (−1055.0) | −1912.0 (−1814.0) |

TABLE 2

| | STREAM ID | | | | | |
|---|---|---|---|---|---|---|
| | 2 | 4 | 6 | 18 | 20 | 22 |
| Mole Flow Kg mol/h (lb mol/hr) | | | | | | |
| $H_2$ | | 199.8 (446.4) | 64.2 (141.6) | | 11437.0 (25213.8) | |
| C1 | 7967.2 (37564.4) | 6028.8 (13290.9) | 1938.5 (4273.5) | | 90.8 (200.1) | |
| C2 | 265.8 (585.9) | 201.3 (443.4) | 64.7 (142.6) | | | |
| C3 | 45.4 (100.1) | 34.4 (75.8) | 11.3 (24.4) | | | |
| C4 | 15.2 (33.4) | 0.5 (25.3) | 3.7 (8.3) | | | |
| C5 | 5.0 (13.1) | 3.8 (8.4) | 1.2 (2.7) | | | |
| C6 | 3.4 (7.4) | 2.5 (5.6) | 0.8 (1.8) | | | |
| CD ($CO_2$) | 59.7 (131.6) | 45.2 (99.6) | 14.5 (32.0) | | 336.4 (741.2) | 1043.7 (2300.9) |
| CM (CO) | | | | | 6232.2 (13739.6) | |
| WA ($H_2O$) | | | | | 1539.2 (3393.3) | |
| $O_2$ | | | | 4146.2 (9140.6) | | |
| AR (Ar) | | | | 20.8 (45.9) | 20.8 (45.9) | |
| $N_2$ | 48.8 (107.5) | 36.9 (81.4) | 11.9 (26.2) | (81.4) | 36.9 | |
| Mole percent | | | | | | |
| $H_2$ | | 3.00% | 3.00% | | 58.10% | |
| C1 | 94.70% | 91.80% | 91.80% | | 0.50% | |
| C2+ | PRESENT | PRESENT | PRESENT | | | |
| CD ($CO_2$) | 0.70% | 0.70% | 0.70% | | 1.70% | 100.00% |
| CM (CO) | | | | | 31.60% | |
| WA ($H_2O$) | | | | | 7.80% | |
| $O_2$ | | | | 99.50% | | |
| AR (Ar) | | | | 0.50% | 0.10% | |
| $N_2$ | 0.60% | 0.60% | 0.60% | | 0.20% | |

| | STREAM ID | | | |
|---|---|---|---|---|
| | 24 | 28 | 38 | 40 |
| Mole Flow Kg mol/h (lb mol/hr) | | | | |
| $H_2$ | 11437.0 (25213.8) | 10784.3 (23774.9) | 64.2 (141.6) | 16429.3 (36219.7) |
| C1 | 90.8 (200.1) | 47.3 (104.3) | 1938.5 (4273.5) | 397.9 (877.1) |
| C2 | | | 64.7 (142.6) | |
| C3 | | | 11.1 (24.4) | |
| C4 | | | 3.7 (8.1) | |
| C5 | | | 1.2 (2.7) | |
| C6 | | | 0.8 (1.8) | |
| CD ($CO_2$) | 1380.1 (3042.5) | 597.0 (1316.1) | 14.6 (32.0) | 970.6 (2139.7) |
| CM (CO) | 6232.2 (13739.6) | 7058.9 (15561.9) | | 8476.0 (18685.0) |
| WA ($H_2O$) | 1539.2 (3393.3) | 2278.8 (5023.9) | 4466.1 9845.9) | 4609.8 (10162.6) |
| $O_2$ | | | | |
| AR (Ar) | 20.8 (45.9) | 20.8 (45.9) | | 20.8 (45.9) |

TABLE 2-continued

| | | | | |
|---|---|---|---|---|
| N$_2$ | 36.9 | 36.9 | 11.9 | 48.8 |
| | (81.4) | (81.4) | (26.2) | (107.5) |
| Mole percent | | | | |
| H$_2$ | 55.20% | 51.80% | 1.00% | 53.10% |
| C1 | 0.40% | 0.20% | 29.50% | 1.30% |
| C2+ | | | PRESENT | |
| CD (CO$_2$) | 6.70% | 2.90% | 0.20% | 3.10% |
| CM (CO) | 30.10% | 33.90% | | 27.40% |
| WA (H$_2$O) | 7.40% | 10.90% | 67.90% | 14.90% |
| O$_2$ | | | | |
| AR (Ar) | 0.10% | 0.10% | | 0.10% |
| N$_2$ | 0.20% | 0.20% | 0.20% | 0.20% |

Figure 2:
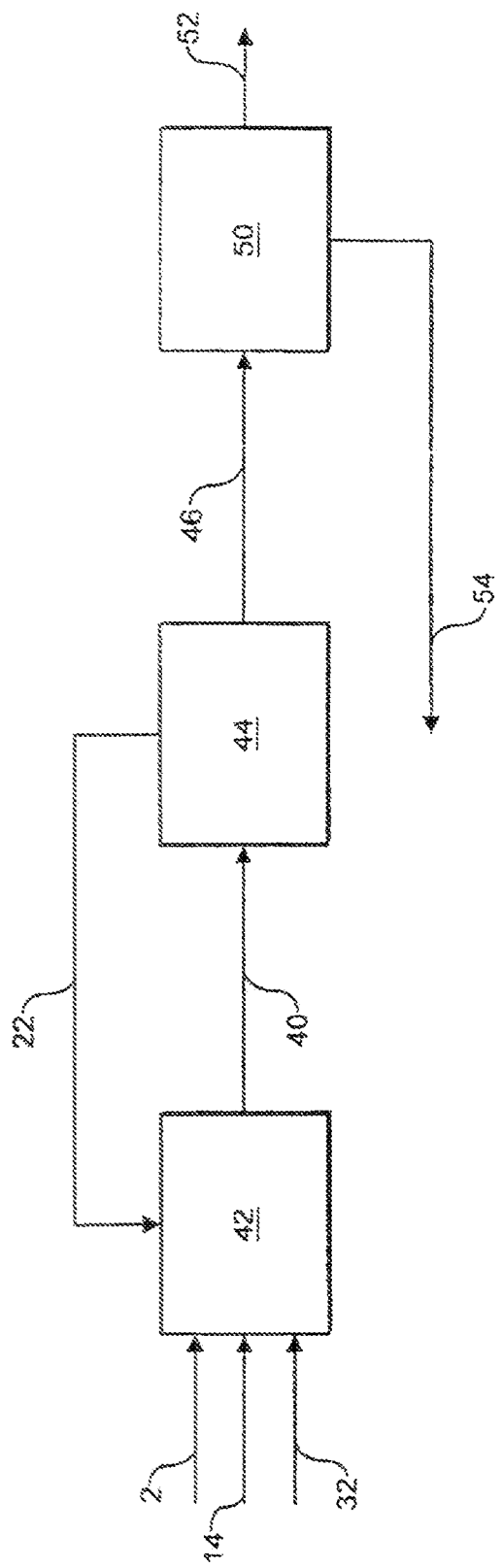
FIG. 2 is a flowsheet describing a hydrocarbon conversion process in which the process of FIG. 1 is integrated with a downstream generic syngas conversion process to produce hydrocarbon liquid fuels or other liquid products.

Referring now to FIG. 2, a syngas generation system 42 of the type depicted in FIG. 1 is fed by a stream 2 of hydrocarbon fuel gas, a stream 14 of oxygen or air and a stream 32 of steam. A stream 40 of syngas is removed from the syngas generation system 42 and fed to a syngas conversion system 44. The syngas conversion system 44 may use an F-T process to synthesize liquid hydrocarbons or involve the synthesis of methanol, DME or oxo-alcohols. A stream 46 of raw conversion product is removed from the syngas conversion system 44 and upgraded and refined 50 to produce the liquid products 52.

A stream 22 of reactive diluent gas is recycled from the syngas conversion system 44 to the syngas generation system 42. A recycle stream 54 may also be taken from the product upgrading and refining process 50.

Figure 3:
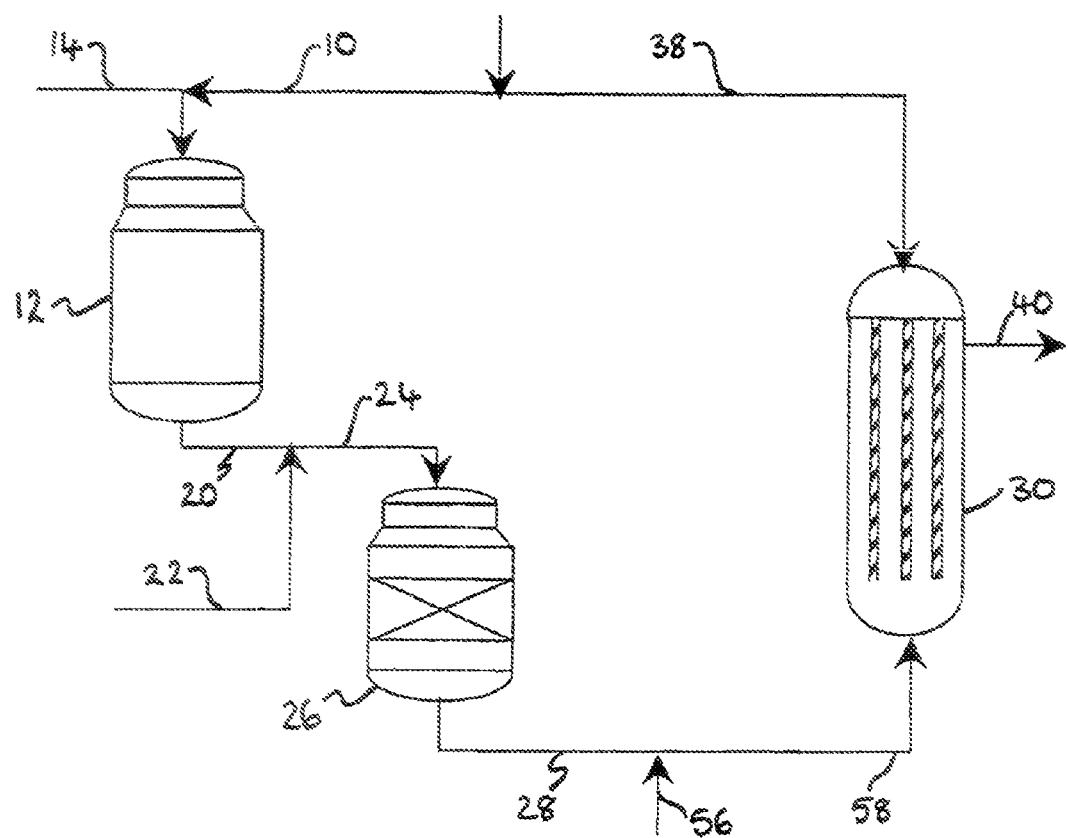
FIG. 3 is a flowsheet describing another embodiment of the process of the present invention.

Referring now to FIG. 3, a stream 14 of oxygen and a stream 10 of natural gas are fed to a reactor 12 in which syngas is generated exothermically. A stream 20 of exothermically generated syngas product is removed from the reactor 12. A stream 22 of a first reactive diluent is injected into the syngas product stream 20 to form a combined stream 24 which is fed to a second reactor 26 in which either or both of a reverse water gas shift reaction and a gasification reaction take place. A stream 28 of reacted syngas product is removed from the second reactor 26 and is combined with a stream 56 of a second diluent fluid to form a combined stream 58 which is fed to a shell-and-tube style heat exchange reformer 30. The second diluent fluid may adjust the temperature of the reacted syngas product and/or change the composition of the reacted syngas product which, inter alia, helps the reformer 30 to operate more efficiently.

A stream 38 of natural gas is fed to the tube side of reformer 40 where it is reacted endothermically in the presence of steam to produce a second syngas product. Combined stream 58 is fed to the shell side of the reformer and, thus, heat originally from the exothermic generation of syngas is used to drive the endothermic syngas generation reaction. A stream 40 of combined syngas product is removed from the reformer 30 and further processed.

Throughout the specification, the term "means" in the context of means for carrying out a function is intended to refer to at least one device adapted and/or constructed to carry out that function.

It will be appreciated that the invention is not restricted to the details described above with reference to the preferred embodiments but that numerous modifications and variations can be made without departing from the spirit or scope of the invention as defined in the following claims

What is claimed is:

1. Apparatus for the production of syngas, comprising: a first reactor configured to exothermically react hydrocarbon-containing fuel with an oxidant gas to produce an exothermically-generated syngas product, the oxidant gas including molecular oxygen; a second reactor; a conduit configured to feed an effluent stream of the exothermically generated syngas product from the first reactor to the second reactor; an element connected to the conduit is configured to cool the exothermically-generated syngas product by combining a reactive diluent gas with the effluent stream, producing a mixture, the mixture including carbon dioxide and solid carbon particles; a reverse water gas shift reaction zone in the second reactor configured to react the carbon dioxide and the molecular hydrogen in the mixture over a catalyst, and, thereby increase a carbon monoxide concentration of the mixture; and a gasification reaction zone in the second reactor configured to react the carbon particles with at least one other component in the mixture, and, thereby decrease a concentration of the solid carbon.

2. The apparatus of claim 1, further comprising: a heat exchange reformer configured to endothermically reform hydrocarbon-containing fuel gas with steam over a catalyst to produce a heat exchange reformed syngas product; and conduit configured to feed reacted syngas product from the second reactor to the heat exchange reformer, wherein the endothermic reforming uses at least a portion of the heat generated in the exothermic reaction.

3. The apparatus of claim 2, the reformer comprises an enhanced heat transfer reformer.

4. The apparatus of claim 1, the first reactor comprises a partial oxidation reactor.

* * * * *